UNITED STATES PATENT OFFICE.

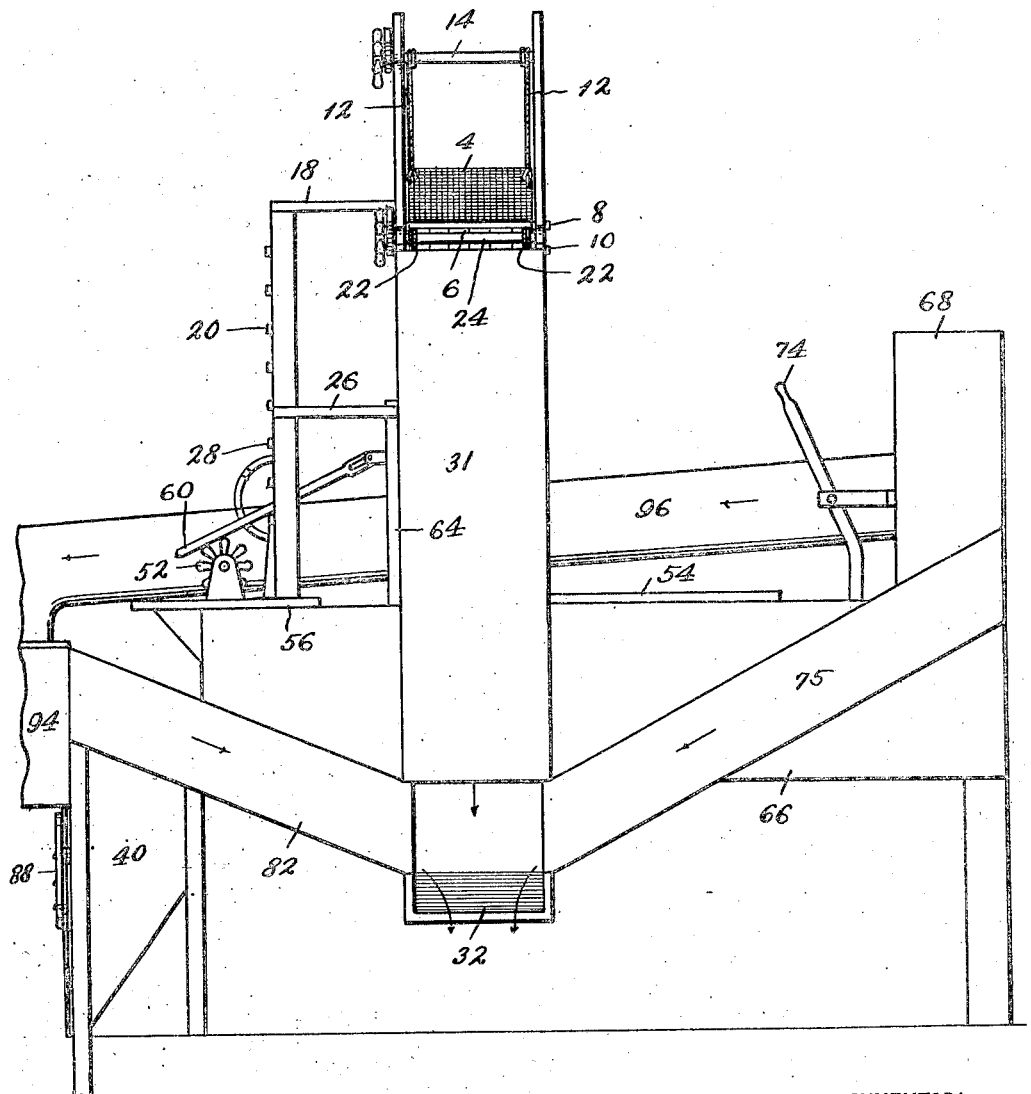

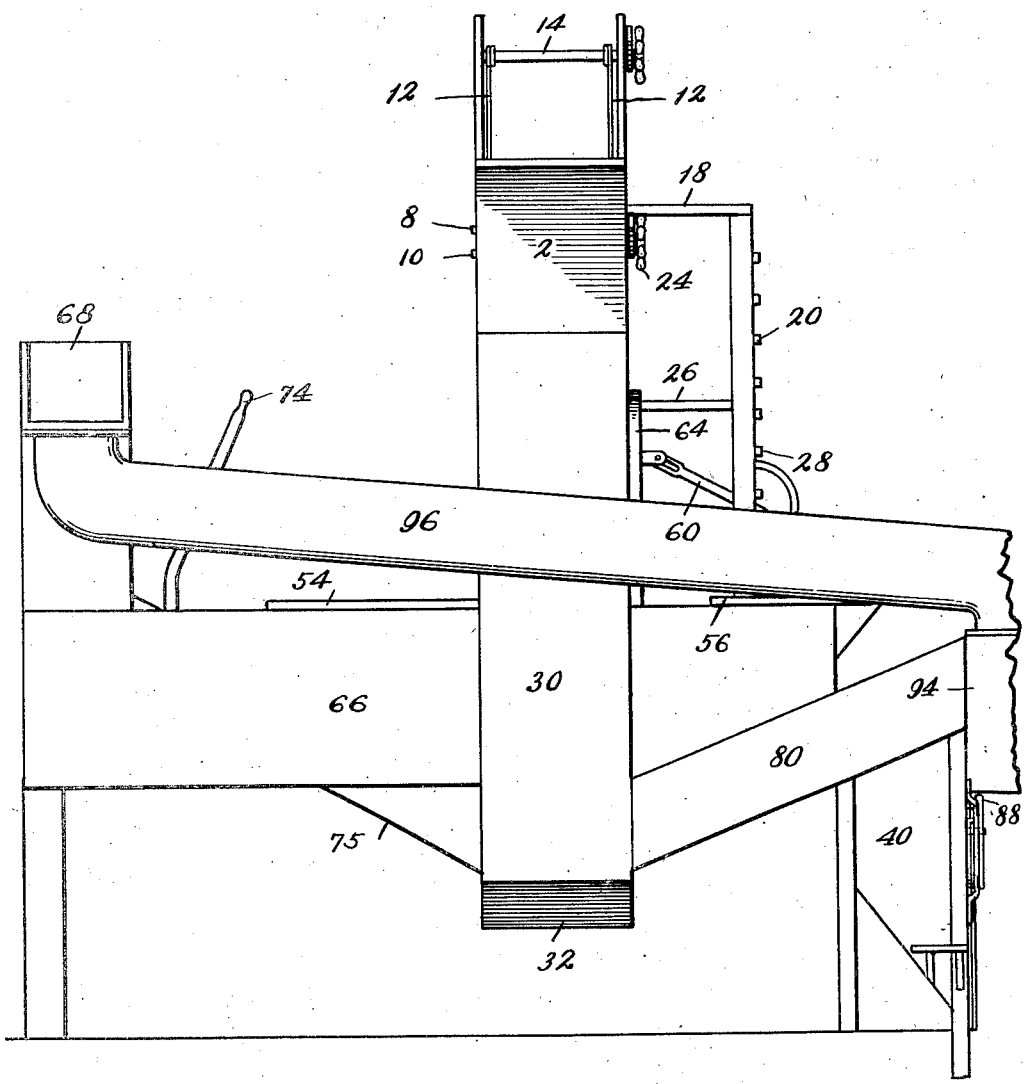

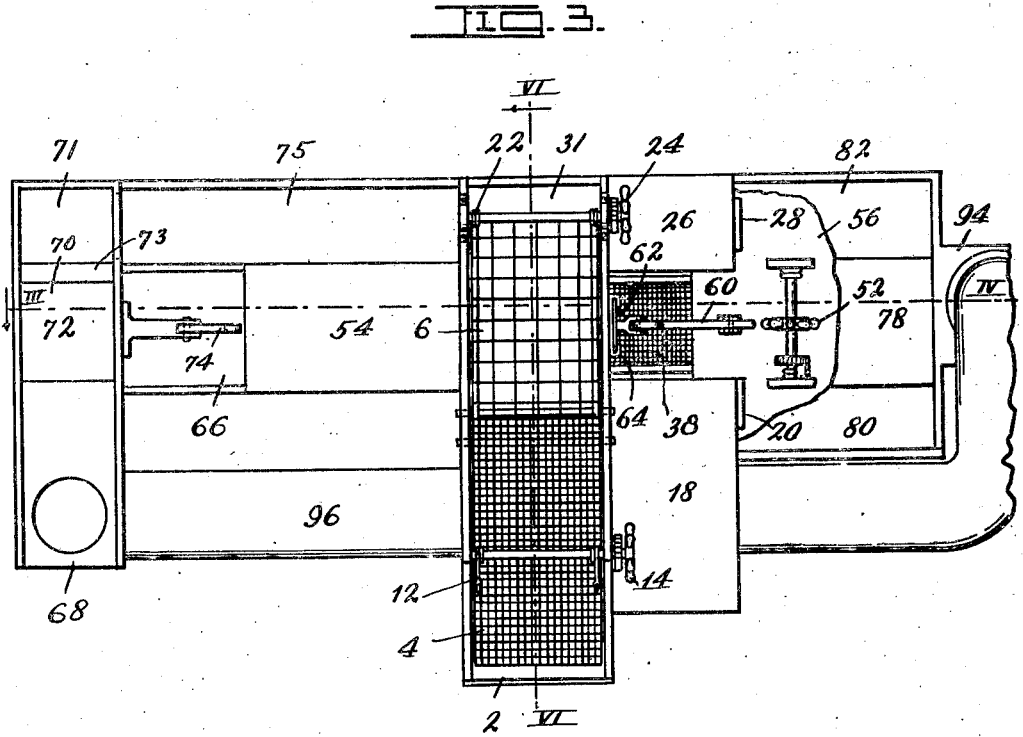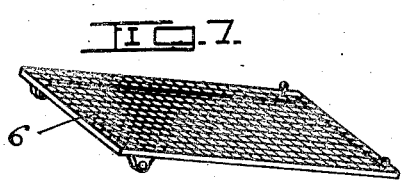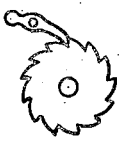

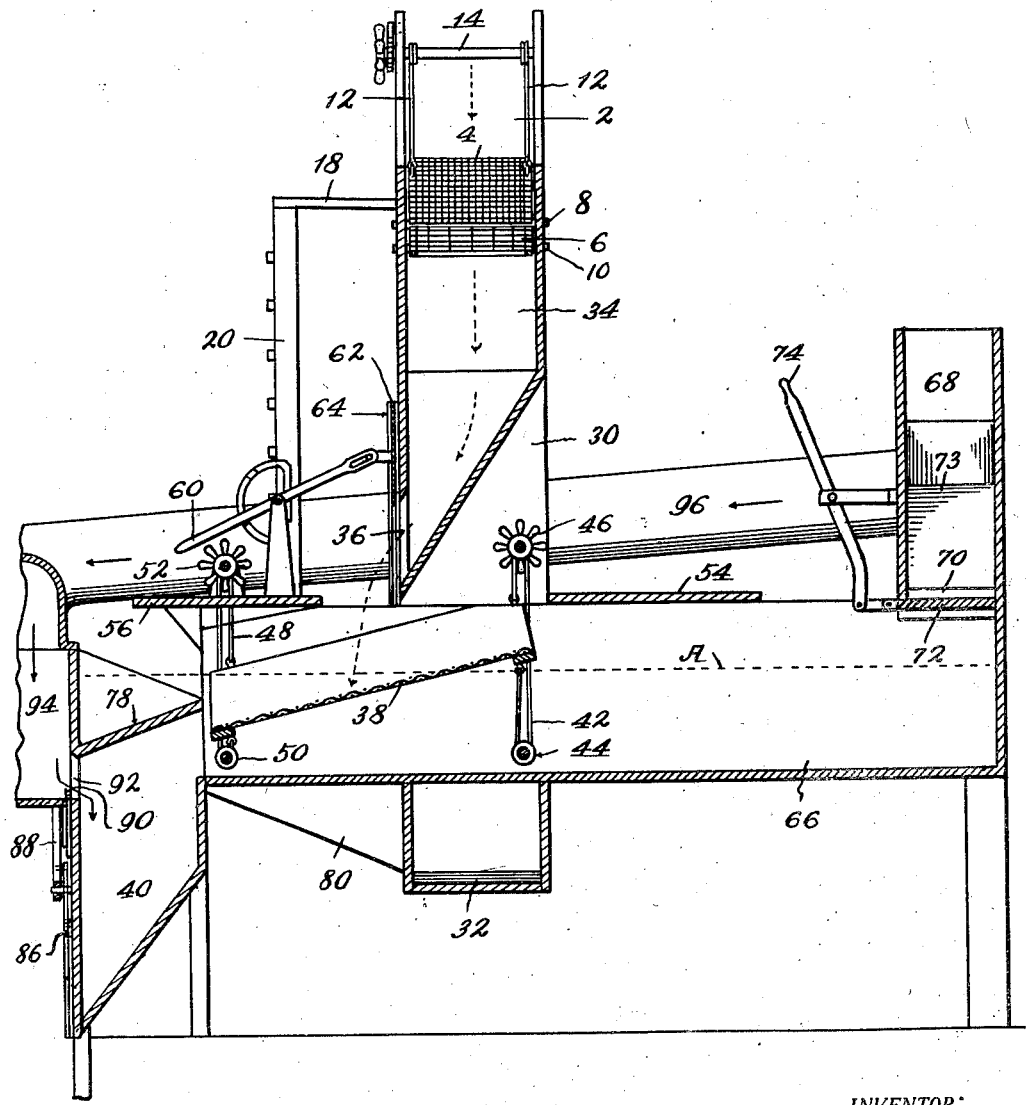

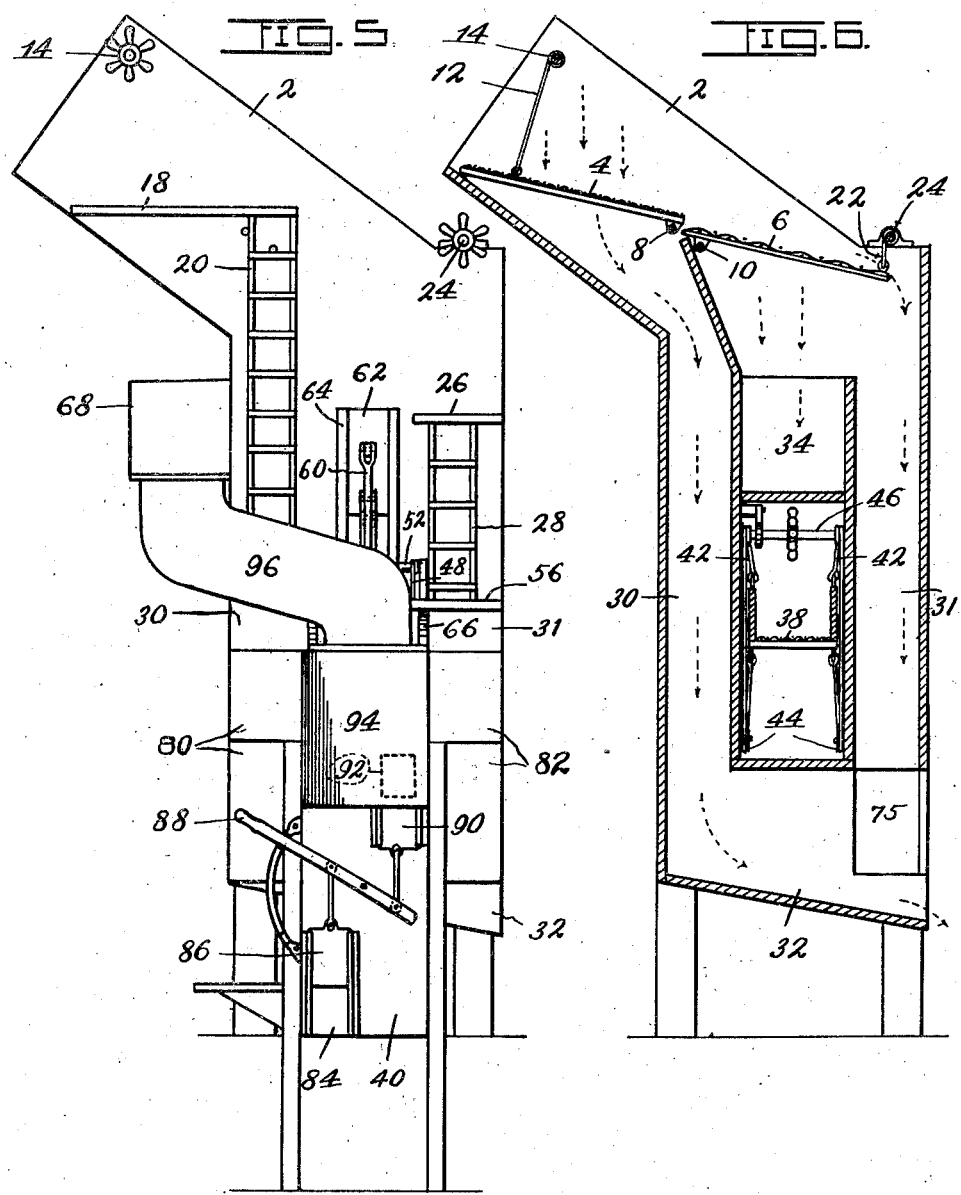

JOHN S. G. LAMB, JR., OF KANSAS CITY, MISSOURI.

GRAVEL-CLEANING APPARATUS.

1,368,267. Specification of Letters Patent. Patented Feb. 15, 1921.

Application filed December 19, 1919. Serial No. 346,126.

*To all whom it may concern:*

Be it known that I, JOHN S. G. LAMB, JR., a citizen of the United States, residing at Kansas City, in the county of Jackson and State of Missouri, have invented certain new and useful Improvements in Gravel-Cleaning Apparatus, of which the following is a specification.

My invention relates to a new and useful apparatus for separating sticks, leaves and other debris from gravel and washing clay and dirt from said gravel, so that the same may be used for all commercial purposes to which it is adapted after being taken from a river bed, gravel pit or elsewhere.

The objects of the invention are to provide an apparatus which is largely automatic, so that it may be operated at minimum cost, is not liable to get out of order, and is capable of washing a large quantity of gravel in a relatively short period of time.

In order that the invention may be fully understood reference will now be had to the accompanying drawings, in which:

Figure 1 is a side elevation of the apparatus.

Fig. 2 shows the reverse side of the apparatus from that disclosed on Fig. 1.

Fig. 3 is a plan view of the apparatus.

Fig. 4 is a longitudinal section taken on line IV—IV of Fig. 3.

Fig. 5 is an end elevation of the apparatus.

Fig. 6 is a vertical cross section taken on line VI—VI of Fig. 3.

Fig. 7 is a detail of a removable screen.

Fig. 8 is a detail of a pawl and ratchet wheel employed in carrying out the invention.

In carrying out the invention, I employ a receiving chute 2 containing a fine mesh screen 4 and a coarse mesh screen 6, the latter being arranged beneath the discharge end of the former. The screens 4 and 6 are mounted at their adjacent ends upon pivots 8 and 10, respectively, so that their opposite ends may be raised or lowered to gain sufficient pitch to cause the gravel and debris mixed therewith to pass downwardly by the force of gravity.

The upper rear end of the screen 4 is adjusted up and down through the intermediacy of cables 12 attached at their lower ends to said screen and at their upper ends to a windlass 14 journaled in the upper portion of the chute 2 and operated from a platform 18 to which access is gained by a ladder 20.

The upper forward end of the screen 6 is adjusted up and down with cables 22 attached at their lower ends to said screen 6 and at their upper ends to a windlass 24, operated from a platform 26 to which access is gained by a ladder 28.

The clay, dirt and other fine particles of debris which pass through the screen 4 fall through a vertical shaft 30 leading from the receiving chute 2 to a main discharge chute 32 located near the central lower portion of the apparatus.

Debris and gravel which are too coarse to pass through the screen 6 are discharged from the lower end thereof into a vertical shaft 31 leading from the lower portion of the receiving chute 2 to the discharge chute 32.

The screen 6 is of such mesh as to permit the desired size of gravel to pass therethrough and when other sizes are desired, said screen 6 is removed from the pivot 10 and a screen of the desired mesh is substituted. The gravel passing through the screen 6 falls through a chute 34 having a discharge opening 36 in its lower portion which directs the partly cleaned gravel upon an inclined screen 38, either end of which may be adjusted vertically to give said screen sufficient pitch to cause the gravel to pass thereover by the force of gravity aided by a current of water and fall into a bin 40, arranged below the discharge end of said screen 38.

The rear end of the screen 38 is raised and lowered through the intermediacy of cables 42 attached at their ends to the top and bottom of said screen and running around sheaves 44 below the screen and a windlass 46 arranged above said screen 38, as disclosed on Fig. 4. The forward or discharge end of the screen 38 is raised and lowered by cables 48 attached at their ends to the upper and lower portion of the screen and running around sheaves 50 below the screen and a windlass 52 arranged above said screen.

All of the windlasses are equipped with pawls and ratchets such as shown on Fig. 8, or their equivalents, to prevent said windlasses from accidentally unwinding.

Platforms 54 and 56 are provided adjacent to the windlasses 46 and 52, respectively, for an operator to stand upon while turning said windlasses. The platform 56 also serves as a support for the operator while actuating a lever 60, connected to a gate 62 operating in slideways 64 and adapted to cover and uncover the discharge opening 36 in the lower portion of the chute 34.

The screen 38 is suspended in a flume 66 to which water is admitted from a supply duct 68 arranged at one end of said flume 66 into which it discharges through an opening 70, controlled by a gate 72 actuated with a lever 74 accessible from the platform 54. When the gate 72 is closed the water in the supply chute 68 escapes through an opening 71, communicating with a waste water chute 75, leading down to the main discharge chute 32. The water is maintained by a barrier 73, at a high enough level in the supply chute 68, to supply a duct 96 hereinafter referred to.

The running water within the flume 66 is maintained approximately on a level indicated by the dotted line A, Fig. 4, so as to pass freely through the screen 38 and skim off any small sticks or other light debris mixed with the gravel and carry it over the top 78 of the bin 40 and down through two oppositely-disposed discharge chutes 80 and 82, arranged at opposite sides of the flume 66 and leading to the main discharge chute 32.

After the bin 40 is nearly filled with clean gravel the same is discharged from the lower portion of said bin through an opening 84, adapted to be covered or uncovered by a gate 86 controlled by a lever 88, which is connected to a second gate 90 arranged to cover and uncover an opening 92, in the upper portion of the bin to admit a supply of water to take the place of that discharged through the lower opening 84 with the gravel, and thus maintain the proper water level in the flume 66. The upper opening 92 communicates with a chamber 94 arranged at the upper front portion of the bin 40 and supplied with water through the duct 96, which leads from the water supply chute 68.

In practice, the apparatus is usually located where a continuous supply of water may be had for supplying the duct 68, so that when the gate 72 is opened a stream of water enters the flume 66 and in passing through the screen 38, carries any light foreign matter off the gravel and over the top 78 of the bin 40, where said stream divides and flows down to the main discharge chute 32 through the two oppositely disposed discharge chutes 80 and 82, while the clean gravel passes into the bin 40 from which it is discharged as needed through the opening 84. As hereinbefore stated, when the opening 84 at the rear portion of the bin is uncovered, the opening 92 at the upper portion of said bin is also uncovered to admit a supply of water from the chamber 94 to take the place of that flowing out through the opening 84. Thus the water in the flume is always maintained at approximately the same level. As the gravel to be cleaned enters the chute 2, the major portion of the debris is separated therefrom and falls into the vertical chutes 30 and 31, which carry it to the main discharge chute 32, while the partly cleaned gravel of proper size passes through the screen 6 and is discharged by the chute 34 upon the screen 38, where the final cleaning takes place by the current of water passing through said screen 38.

From the foregoing description, it will be readily understood that I have provided an apparatus which can be maintained and operated at small cost and one having a large capacity for cleaning gravel of any desired size, and while I have shown the preferred form of my invention, I reserve the right to make such changes in the construction, proportion and arrangement of parts, as properly fall within the spirit and scope of the claims.

Having thus described my invention, what I claim and desire to secure by Letters Patent, is:

1. In an apparatus of the character described, a receiving chute for material to be cleaned, a screen within said chute to separate the material from a portion of the accompanying debris, a second screen arranged to receive the partly cleaned material from the first screen and which is inclined to discharge the material, means for conducting a stream of water through the second screen to wash the material, a bin to receive the washed material from the second screen, a gate at the lower portion of said bin to control the discharge of material and water, and a gate at the upper portion of the bin communicating with a supply of water to take the place of the water discharged from the bin with the material.

2. In an apparatus of the character described, a receiving chute for material to be cleaned, a screen within said chute to separate the material from a portion of the accompanying debris, a second screen arranged to receive the partly cleaned material from the first screen and which is inclined to discharge the material, a bin to receive the material from the second screen, a water supply to wash the material in its passage to the bin, a gate at the lower portion of said bin to control the discharge of material and water, a gate at the upper portion of the bin communicating with a supply of water to take the place of the water discharged from the bin with the material, and manual means for simultaneously opening and closing said gates.

3. In an apparatus of the character described, a receiving chute for material to be cleaned, a screen within said chute to separate the material from a portion of the accompanying debris, a second screen arranged to receive the partly cleaned material from the first screen and which is inclined to discharge the material, a bin to receive the material from the second screen, a water supply to wash the material in its passage to the bin, a gate at the lower portion of said bin to control the discharge of material, a gate at the upper portion of the bin, and a duct carrying water for admission to the bin through the upper gate to take the place of the water discharged from the bin with the material.

4. In an apparatus of the character described, a receiving chute for material to be cleaned, a screen within said chute to separate the material from a portion of the accompanying debris, a second screen arranged to receive the partly cleaned material from the first screen and which is inclined to discharge the material, a gate to control the passage of the material to the second screen, and a flume in which the second screen is located and through which a stream of water flows to wash the material as it passes over said second screen.

5. In an apparatus of the character described, a receiving chute for material to be cleaned, a screen within said chute to separate the material from a portion of the accompanying debris, a second screen arranged to receive the partly cleaned material from the first screen and which is inclined to discharge the material, a flume in which the second screen is located and through which a stream of water flows to wash the material as it passes over said second screen, a water supply chute communicating with the flume and a gate to control the passage of water from said supply chute to the flume.

6. In an apparatus of the character described, a receiving chute for material to be cleaned, a screen within said chute to separate the material from a portion of the accompanying debris, a second screen arranged to receive the partly cleaned material from the first screen and which is inclined to discharge the material, a flume in which the second screen is located and through which a stream of water flows to wash the material as it passes over said second screen, a water supply chute communicating with the flume, and a waste water chute communicating with the supply chute.

7. In an apparatus of the character described, a receiving chute for material to be cleaned, a relatively fine screen within said chute, a shaft arranged below said screen to receive debris therefrom, a main discharge chute communicating with the lower end of said shaft, a relatively coarse screen to receive the material from the fine screen, a chute arranged to receive the material passing through said coarse screen, an inclined screen beneath the last chute to receive and discharge the material, means for conducting a stream of water through the last screen to wash the material, and a shaft arranged below the discharge end of the relatively coarse screen and communicating with the main discharge chute to carry off debris and coarse material passing over said relatively coarse screen.

8. An apparatus of the character described, consisting of a receiving chute for material to be cleaned, a relatively fine screen within said chute, a shaft arranged below said screen to receive debris therefrom, a main discharge chute communicating with the lower end of said shaft, a relatively coarse screen to receive the material from the fine screen, a chute arranged to receive the material passing through said coarse screen, an inclined screen beneath the last chute to receive and discharge the material, a bin to receive the material from the last screen, a flume in which the last screen is arranged, a water supply chute communicating with said flume, chutes leading to the main discharge chute for carrying off the greater portion of the water from the flume, and a shaft arranged below the discharge end of the relatively coarse screen and communicating with the main discharge chute to carry off debris and coarse material passing over said relatively coarse screen.

In testimony whereof I affix my signature in the presence of two witnesses.

JOHN S. G. LAMB, Jr.

Witnesses:
F. G. Fischer,
L. J. Fischer.